US010354192B2

(12) United States Patent

Livingston et al.

(10) Patent No.: US 10,354,192 B2

(45) Date of Patent: Jul. 16, 2019

(54) RECOMMENDER SYSTEM FOR EXPLORATORY DATA ANALYSIS

(71) Applicant: The United States of America, as represented by the Secretary of the Navy, Washington, DC (US)

(72) Inventors: Mark A. Livingston, Alexandria, VA (US); Stephen Russell, Laurel, MD (US); Jonathan W. Decker, Silver Spring, MD (US); Suleyman Guleyupoglu, Springfield, VA (US); Antonio Gilliam, Lorton, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 469 days.

(21) Appl. No.: 14/944,802

(22) Filed: Nov. 18, 2015

(65) Prior Publication Data

US 2017/0316319 A1 Nov. 2, 2017

Related U.S. Application Data

(60) Provisional application No. 62/081,706, filed on Nov. 19, 2014.

(51) Int. Cl.

| | |
|---|---|
| ***G06F 17/00*** | (2019.01) |
| ***G06N 5/04*** | (2006.01) |
| *G06Q 30/02* | (2012.01) |

(52) U.S. Cl.

CPC .......... *G06N 5/04* (2013.01); *G06Q 30/0201* (2013.01); *G06Q 30/0282* (2013.01)

(58) Field of Classification Search

CPC ........... G06N 5/02; G06N 5/04; G06Q 30/00; G06Q 30/02; G06Q 30/0201; G06Q 30/0255; G06Q 30/0282; G06Q 30/0631; H04N 21/466; H04N 21/4668; H04N 21/4755; H04N 21/84; H04N 21/44222

USPC ..................................................... 706/15, 45

See application file for complete search history.

(56) References Cited

U.S. PATENT DOCUMENTS

2009/0158179 A1* 6/2009 Brooks ................. G06Q 10/00 715/762

OTHER PUBLICATIONS

J. Herlocker, J. Konstan, L. Terveen, and J. Riedl. Evaluating collaborative filtering recommender systems. ACM Transactions on Information Systems, 22(1):5-53, 2004.

L. Wilkinson, A. Anand, and R.L. Grossman. Graph-Theoretic Scagnostics. In IEEE Symposium on Information Visualization, pp. 157-164, Oct. 2005.

(Continued)

*Primary Examiner* — David R Vincent

(74) *Attorney, Agent, or Firm* — US Naval Research Laboratory; William P. Ladd

(57) ABSTRACT

Systems and methods for enhancing exploratory data analysis using a recommender system are provided. The recommender system receives feedback when a set of raw data is analyzed (e.g., from one or more data analysts exploring a data set). Based on the collected feedback, the recommender system can automatically infer the need for certain analytical operations to be performed on a data set. These inferences can be used by the recommender system to infer analytical operations when new data sets are analyzed.

20 Claims, 10 Drawing Sheets

(56) References Cited

OTHER PUBLICATIONS

A. Endert, P. Fiaux, and C. North. Semantic interaction for sensemaking: Inferring analytical reasoning for model steering. IEEE Transactions on Visualization and Computer Graphics, 18(12):2879-2888, Dec. 2012.

N. Harvey and R. Porter. User-driven sampling strategies in image exploitation. In SPIE Visualization and Data Analysis, Feb. 2014.

L. Battle, M. Stonebraker, and R. Chang. Dynamic reduction of query result sets for interactive visualizaton. In IEEE International Conference on Big Data, Workshop 5: The First Workshop on Big Data Visualization, pp. 1-8, Oct. 2013.

E. Papenhausen, B.Wang, S. Ha, A. Zelenyuk, D. Imre, and K. Mueller. GPU-accelerated incremental correlation clustering of large data with visual feedback. In IEEE International Conference on Big Data, Workshop 5: The First Workshop on Big Data Visualization, pp. 63-70, Oct. 2013.

D. Cheng, P. Schretlen, N. Kronenfeld, N. Bozowsky, and W. Wright. Tile based visual analytics for twitter big data exploratory analysis. In IEEE International Conference on Big Data (Poster Session), pp. 2-4, Oct. 2013.

P. Xuan, Y. Zheng, S. Sarupria, and A. Apon. Sciflow: A dataflow-driven model architecture for scientific computing using hadoop. In IEEE International Conference on Big Data, Workshop 6: Big Data and Science: Infrastructure and Services, pp. 36-44, Oct. 2013.

G. Petasis, F. Vichot, F. Wolinski, G. Paliouras, V. Karkaletsis, and C. D. Spyropoulos. Using machine learning to maintain rule-based named-entity recognition and classification systems. In 39th Conference of Association for Computational Linguistics, pp. 418-425, Jul. 2001.

J. Bergstra and Y. Bengio. Random search for hyper-parameter optimization. J. Mach. Learn. Res., 13(1):281-305, Feb. 2012.

G. Adomavicius and D. Jannach. Special issue on context-aware recommender systems. User Model User-Adap Inter, 24(1-2):1-5, 2014.

M. A. Livingston, A. Palepu, J. Decker, and M. Dermer. A randomized framework for discovery of heterogeneous mixtures. In SPIE Visualization and Data Analysis, Jan. 2011.

S. Chan, P. Treleaven, and L. Capra. Continuous hyperparameter optimization for large-scale recommender systems. In IEEE International Conference on Big Data, pp. 350-358, Oct. 2013.

* cited by examiner

RECOMMENDER SYSTEM FOR EXPLORATORY DATA ANALYSIS

CROSS REFERENCE TO RELATED APPLICATIONS

This application claims the benefit of U.S. Provisional Patent Application No. 62/081,706, filed on Nov. 19, 2014, which is incorporated by reference herein in its entirety.

FIELD OF THE DISCLOSURE

This disclosure relates to data analysis systems, including adaptive and predictive data analysis systems.

BACKGROUND

In many scientific fields, data analysts analyze raw data and process this raw data to glean useable information. For example, a data analyst can use visual and textual representations of data with analytical operations to explore, understand, and generate hypotheses for evaluation based on this data. As advances have been made in technology that allows data to be gathered in increasingly larger volume and complexity, processing data in an efficient and meaningful manner has become an important and difficult challenge. As data sets become larger and more complex, an increasing amount of expertise may be needed to adequately analyze the raw data to discern useful conclusions. Data analysis in many fields requires a data analyst to have access to expert knowledge both in the domain of the underlying subject matter of the data and also in the techniques uses to process the raw data to derive conclusions.

Adequately trained experts are not always easily available to interpret these increasingly large and complex data sets. Thus, there is a need for assistance in data analysis. Previous attempts to provide assistance for data analysis have not adequately captured the knowledge and experience that an expert data analyst would use when analyzing a large, complex set of data.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
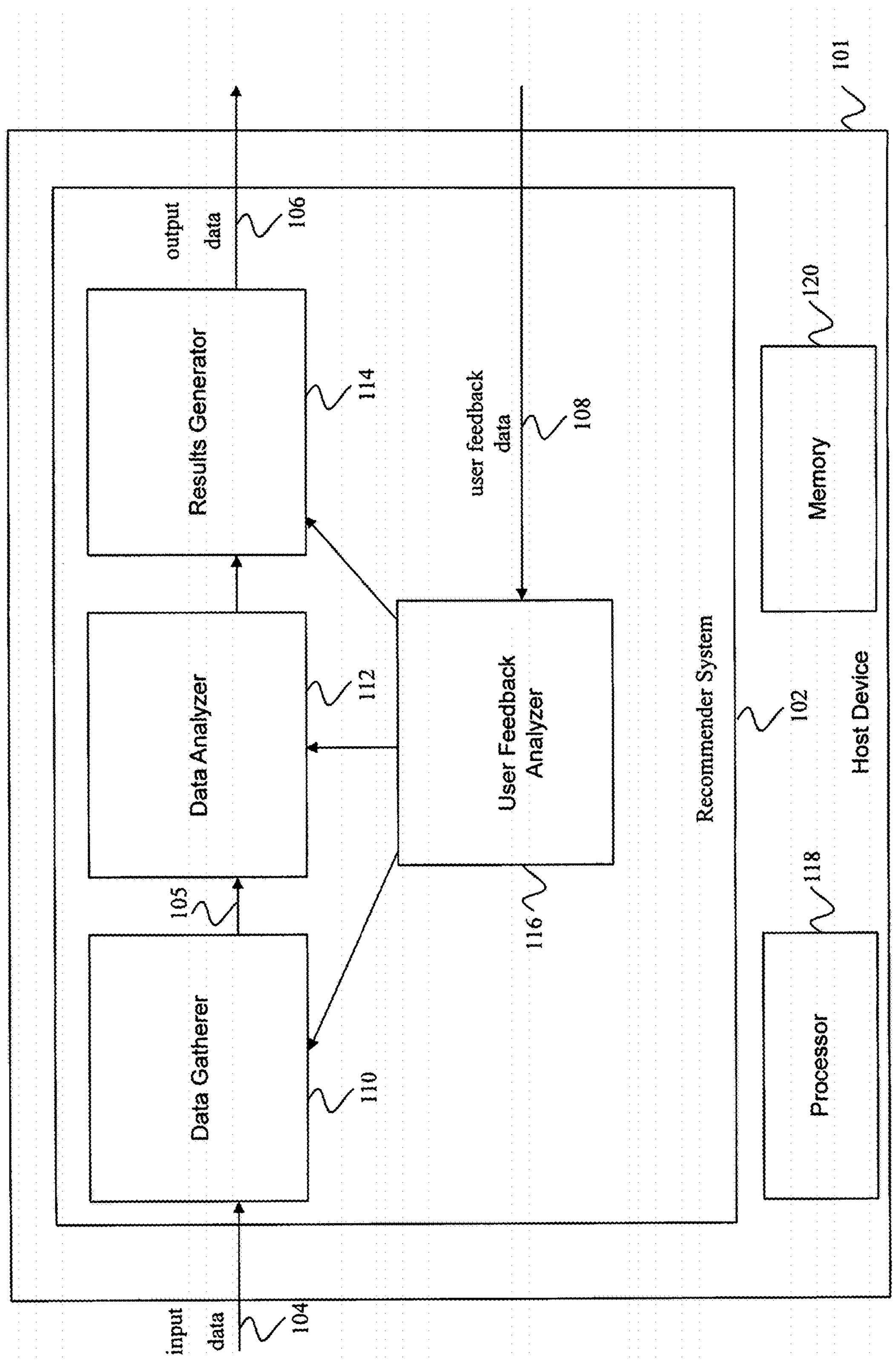
FIG. 1 is a block diagram of an exemplary recommender system in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include one of software, or firmware, or hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Overview

Embodiments of the present disclosure provide systems and methods for enhancing exploratory data analysis using a recommender system. The recommender system can predict what data analysis a user (e.g., an analyst) would likely be interested in and can adapt to feedback received from the user and other users with similar interests and/or backgrounds. In an embodiment, the recommender system can recommend operations and analytical results to examine to an analyst. Based on observations about the data (e.g., whether the data contains text and/or numerical data fields), the recommender system can infer steps the user may wish to take in exploring and analyzing the data. As the user makes specific requests using the recommender system, his or her interests in explaining certain data or filtering the data in certain ways can lead to more precise analytical operations performed by the recommender system.

Based on this feedback (and/or on feedback from other users), the recommender system can automatically infer the need for certain analytical operations to be performed. These inferences can be used by the recommender system to infer analytical operations when the user (and/or other users) explore new data sets. For example, the recommender system can be configured to recommend combinations of data that may be statistically interesting, operations that are relevant to the data in the EDA process, operations that are relevant to a methodology, and/or results that may engender creative decision making.

By analyzing all data to determine which operations and/or variables to recommend, embodiments of the present disclosure can advantageously lead to insights that a data analyst and/or domain expert might not reach. For example, by thoroughly analyzing data to determine which operations lead to statistically significant results, a recommender system in accordance with an embodiment of the present disclosure can recommend using an operation and/or variable that most data analysts and/or domain experts might overlook. For example, a particularly variable and/or operation might be relatively obscure or might not typically be relevant for analyzing a certain data set, but the recommender system might determine that, in this case, the results are interesting (e.g., statistically significant). This thorough analysis provided by embodiments of the present disclosure can enable a data analyst and/or domain expert to engage in "outside of the box" thinking by to reach new insights that they might not otherwise reach.

Such recommendations codify expert and individual analytical approaches and preferences to support EDA to integrate domain expertise with analytical expertise. Thus, using systems and methods according to embodiments of the present disclosure, the recommender system can advantageously capture the expertise of a data analyst and a domain expert. It can then use that expertise to lend expert guidance to non-experts, remind experts of potentially forgotten operations, and perhaps promote the adoption of methods of analysis that are novel for the data domain.

2. Recommender Systems

Recommender systems can be used in a variety of fields and applications. A recommender system can use one or more techniques that seek to predict the rating or preference that a user would give an item. For example, a movie recommender system could recommend movies that a user might like based on the user's past history of selected films to rent, and an online shopping recommender system could use a user's past history of products purchased and/or browsed to recommend products to buy. Further, a recommender system could be used for a news site to recommend news stories based on a user's browsing history.

Recommender systems can use collaborative filtering and/or content filtering techniques when recommending an item to a user. For example, collaborative filtering can use a user's behavior and the behavior of similar users when deciding an item to recommend. Content filtering can utilize characteristics of items when making a recommendation. Hybrid systems using both collaborative and content filtering techniques can also be used.

Embodiments of the present disclosure apply recommender systems to exploratory data analysis (EDA) to recommendations for specific operations, sequences of operations, analytical methods, analytical results, etc. to an analyst. Because of the degree of experience and expertise necessary in data analysis in many fields, recommender systems can be especially useful for providing recommendations to a relatively inexperienced data analyst. For example, showing a certain visual representation of the data to the analyst could spark insight on the part of the analyst and help generate hypotheses to test via traditional statistical analysis.

By automating the exploratory aspect of data analysis in accordance with embodiments of the present disclosure, the expertise and experience of an expert can be captured by the recommender system to aid other data analysts. These recommendations can help a novice analyst to develop expertise and can also assist domain experts to perform their own data analyses. For example, a recommender system in accordance with an embodiment of the present disclosure can assist a data analyst with learning and remembering typical sequences of operations, learning new methods that can be helpful in analyzing data, and in automating the analysis rather than requiring that the user specify each operator to apply. The framework provided by embodiments of the present disclosure also helps to unify architectures for learning analytical operations with factors that are also important to EDA, such as layout and visual representations.

3. Exemplary Recommender System

FIG. 1 is a block diagram of an exemplary recommender system 102 in accordance with an embodiment of the present disclosure. Recommender system 102 receives input data 104 and generates output data 106 based on input data 104. For example, input data 104 can be a raw data set input by a user. The data set can be input manually by the user (e.g., using an input device), or the data set can be read from a file, such a text file, a Microsoft Excel file, a Portable Document Format (Adobe Acrobat) file, a special purpose file, etc. In an embodiment, recommender system 102 can gather input data 104 (e.g., via a sensor couple to and/or in communication with recommender system 102). Such data gathering can be performed by recommender system 102 automatically or in response to a command issued to recommender system 102 by a user.

Based on input data 104, recommender system 102 generates output data 106. Output data 106 can take a variety of formats. For example, in accordance with embodiments of the present disclosure, output data 106 can be text data, image data, an executable program, a Microsoft Excel file, a Portable Document Format (PDF) file, a special purpose file, etc. In an embodiment, output data 106 includes data for a visual representation of processed input data 104. For example, output data 106 can include charts, graphs, etc., that are generated based on input data 104 which can be used by a data analyst when analyzing input data 104. In an embodiment, recommender system 102 can receive user feedback data 108, and output data 106 can be modified by recommender system 102 based on user feedback data 108.

In an embodiment, recommender system 102 includes data gatherer 110, data analyzer 112, results generator 114, and user feedback analyzer 116. While each of data gatherer 110, data analyzer 112, results generator 114, and user feedback analyzer 116 is shown separately in FIG. 1, it should be understood that the functionality of each of data gatherer 110, data analyzer 112, results generator 114, and user feedback analyzer 116 can be combined into a single block of code, module, device, etc., or can be further divided into additional blocks of code, modules, devices, etc.

In an embodiment, recommender system 102 is implemented on host device 101. For example, host device 101 can be a computer, such as a general purpose computer or a special purpose computer, or a combination of multiple general or special purpose computers. In an embodiment, host device 101 includes processor 118 and memory 120. However, it should be understood that, in accordance with embodiments of the present disclosure, recommender system 102 includes processor 118 and/or memory 120 and is not part of host device 101. For example, in an embodiment, recommender system 102 is implemented as a single standalone device instead of as part of another device (e.g., host device 101).

In an embodiment, host device 101 is a computer running code for recommender system 102, and recommender system 102 accesses processor 118 and/or memory 120 in host device 101. Memory 120 can be any of a variety of memory types, including a cache, a register, etc. In an embodiment, processor 118 includes processor circuitry for a central processing unit (CPU) that is configured to perform operations for recommender system 102. For example, in an embodiment, memory 120 stores code configured to for performing operations for data gatherer 110, data analyzer 112, results generator 114, and user feedback analyzer 117, and processor 118 includes processor circuitry configured to execute code for performing these operations.

3.1 Data Gatherer

In an embodiment, data gather 110 receives input data 104. Data gatherer 110 can receive input data 104 via direct user input (e.g., via a user input device such as a keyboard, microphone, camera, etc.) or via reading a data file from a disc, a data bus (e.g., via a Universal Serial Bus or other data bus), or a memory (e.g., memory 120, another memory of a host computer (e.g., host device 101), or any other memory accessible by recommender system 102). In an embodiment, data gatherer 110 stores data (e.g., in memory 120). In an embodiment, data gatherer 110 can also receive user feedback data 108, either directly from a user or from an intermediary module, such as user feedback analyzer 116. Data gatherer can store user feedback data 108 in memory (e.g., in memory 120) for further processing.

3.2 Data Analyzer

In an embodiment, data analyzer 112 analyzes gathered data 105 gathered by data gatherer 110. In an embodiment, gathered data 105 includes input data 104 and/or user feedback data 108. In an embodiment, data gatherer 110 sends gathered data 105 to data analyzer 112. In another embodiment, data analyzer 112 reads gathered data 105 from data gatherer 110 (e.g., periodically or in response to determining that new input data 104 or user feedback data 108 has been received by data gatherer 110). In an embodiment, data analyzer 112 performs operations on gathered data 105 and sends the results to results generator 114. For example, in an embodiment, data analyzer 112 can determine, based on analyzing gathered data 105, how output data 106 should be presented to the user. For example, in an embodiment, data analyzer 112 can determine which charts, graphs, analytical operations, etc. should be performed on gathered data 105 so that output data 106 can be presented to a data analyst in a useful way.

In an embodiment, data analyzer 112 can make an initial determination regarding how gathered data 105 should be processed based on stored information. For example, this stored information can be information regarding domain expert recommendations for data analysis corresponding to a type of gathered data 105 and previous recommendations by users of recommender system 102. For example, this information regarding domain expert recommendations and/or previous recommendations by users of recommender system 102 can be stored in a database and/or memory accessible by recommender system 102 (e.g., memory 120, another memory of a host computer (e.g., host device 101), or any other memory accessible by recommender system 102).

In an embodiment, data analyzer 112 can determine the type of gathered data 105 (e.g., based on a file type, user input, and/or information in gathered data 105). Data analyzer can further alter and/or refine the initial determination regarding how gathered data 105 should be processed based on user feedback data 108. In an embodiment, data analyzer 112 ranks potential operations that can be performed on gathered data 105 (e.g., charts, graphs, analytical operations, etc., that can be generated based on gathered data 105). In an embodiment, this ranking is performed by data analyzer 112 based on a determination regarding how useful respective operations are likely to be for a user.

Data analyzer 112 can perform this ranking of potential operations in a variety of ways in accordance with embodiments of the present disclosure. For example, in an embodiment, data analyzer 112 can assign interest values for certain operations, variables, and/or operators for gathered data 112. Recommender system 102 can change and/or update these interest values as new information (e.g., user feedback data 108) is received. For example, an operation may be assigned a certain interest value because a user selected that operation as something he or she wishes to explore further or because an operation is popular with similar users. Additionally, for example, an operation can be assigned a greater than average interest value if recommender system 102 determines that the operation has statistical significance. This interest value can be assigned based on prior user feedback data 108 received from the same or similar user or recently received user feedback data 108 from the current user. In an embodiment, the longer a user explores output data 106 corresponding to a particular operation, the more points can accumulate, until such time as the user indicates a desire to shift the focus.

In an embodiment, an operation, variable, and/or operator can also be assigned interest because an analytical operation involving it is determined to be of statistical significance (e.g., when the probability of obtaining at least as extreme results given that the null hypothesis is true is less than the probability of rejecting the null hypothesis given that it is true) or because its distribution fits a pre-defined or user-defined pattern of interest. For example, a bi-modal distribution may be considered interesting because it might not fit the typical pattern (in contrast to a uniform or a normal distribution). A user may also express a preference for one or more particular analytical operations (e.g., correlation), and this preference can be used to assign or modify one or more interest values corresponding to these one or more analytical operations. This framework enables automatic specification of operations (e.g., those operations that have high interest values can be designated to be conducted if they are not already completed). It also enables prioritization of a large menu of intermediate operations that a user can choose from for display (e.g., by indicating interest in one or more of these operations via user feedback data 108).

In an embodiment, recommender system 102 can store a list of potential operations, ranked according to determined usefulness for a user, and recommender system 102 can change the ordering of the operations in this list (as well as add and/or subtract operations from this list) as new information (e.g., user feedback data 108) is received. Exemplary operations that can be performed on gathered data 105 by data analyzer 112 are discussed in more detail below.

3.3 Results Generator

Once data analyzer determines potential operations to be performed on gathered data 105, data analyzer sends information regarding one or more of these potential operations to results generator 114. This information can be, for example, an identification of analytical (or other) operations to be performed on gathered data 105 and/or an identification of visual representations (such as charts, graphs, etc.) of gathered data 105 to be generated. In an embodiment, results generator 114 generates results, by for example, performing the operations selected by data analyzer 112. In an embodiment, results generator 115 can also generate visual representations of gathered data 105 and/or operations performed on gathered data 105. In an embodiment, results generator 114 or data analyzer 112 is configured to select a predetermined number of results to be generated based on, for example, input from a user. Results generator outputs the generated results as output data 106, which is sent to a user (e.g., by displaying output data 106 on a screen or transmitting it to another output device, e.g., via a data port).

In an embodiment, results generator 114 also generates and/or modifies a user interface (UI) for a user. For example, the user interface can be displayed on a screen and can be used to display output data 106. In an embodiment, the UI can also enable a user to send user feedback data 108 back to recommender system 102. User feedback data 108 can take a variety of forms including text data, voice data, camera data, etc. In an embodiment, the UI provides a text prompt to enable the user to send user feedback data 108. The UI can further include one or more buttons, such as "like" and/or "dislike" buttons to gather user feedback data 108 regarding one or more of the generated results in output data 106. In an embodiment, the UI includes an area that enables the user to request operations, an area that lists pending operations, and an area that lists available results (e.g., sorted according to interest values).

3.4 User Feedback Analyzer

In an embodiment, user feedback analyzer 116 receives user feedback data 108 from a user of recommender system 102. User feedback data 108 can be received in a variety of ways. For example, user feedback analyzer 116 can receive user feedback data 108 via direct user input (e.g., via a user input device such as a keyboard, microphone, camera, etc.) or via reading a data file from a disc, a data bus (e.g., via a Universal Serial Bus or other data bus), or in a memory (e.g., memory 120, another memory of a host computer (e.g., host device 101), or any other memory accessible by recommender system 102). In an embodiment, user feedback data 108 can contain requests for additional and/or modified operations to be performed on input data 104. User feedback data 108 can also include a user indication regarding whether a specific operation was useful (e.g., via a "like" or "dislike" button or a similar indicator). User feedback data 108 can be gathered actively (e.g., data collected in response to specific actions by a user) or passively (e.g., data collected without specific actions by a user).

In an embodiment, user feedback analyzer 108 can collect and analyze user feedback data 108 for use when performing further operations. For example, in an embodiment, user feedback analyzer 116 can use user feedback data 108 to modify stored information in a memory and/or database accessible by recommender system 102 (e.g., memory 120, another memory of a host computer (e.g., host device 101), or any other memory accessible by recommender system 102) regarding previous recommendations by users of recommender system 102. Based on this modification, recommender system 102 can take user feedback data 108 into account when performing future operations on similar input data 104 (e.g., input data from the same data domain, input data of a similar determined data type, input data by the same or similar data analyst, etc.) In an embodiment, user feedback analyzer 116 can send user feedback data 108 to data gatherer 110 (e.g., for storage or to refine output data 106 generated based on input data 104.

In an embodiment, user feedback analyzer 116 can send information to data analyzer 112, e.g., to modify the operations to be performed by data analyzer 112. For example, user feedback data 108 can include a user request for an additional operation to be performed on input data 104 or a user indication (e.g., a "like" or "dislike") regarding a performed operation. In an embodiment, based on information received from user feedback analyzer 116, data analyzer 105 can modify interest values for variables and operators assigned to gathered data 112. In embodiment, data analyzer 105 can modify a list of potential operations to be performed on gathered data 105 based on information received from user feedback analyzer 116. In an embodiment, user feedback analyzer 116 can send user feedback data 108 to results generator 114. For example, based on information from user feedback analyzer 116, results generator 114 can modify a generated result (e.g., by changing the visual representation of a generated result). Results generator 114 can modify output data 106 based on user feedback data 108.

In an embodiment, user feedback analyzer 116 and/or data analyzer 112 uses user feedback data 108 to predict additional operations that may be useful to the user. For example, in an embodiment, if a user indicates an interest in a particular variable, user feedback analyzer 116 and/or data analyzer 112 can determine that the user might also be interested in additional operations for this variable. In an embodiment, these determinations can be made based on stored information that indicates, for example, how an expert would conduct further EDA on the particular indicated variable. In this way, a user can use recommender system 102 to direct exploration of input data 104 along selected paths specified via user interest indications but can still leverage domain expert knowledge for EDA of an indicated variable via stored expert information.

3.5 Exemplary Method for Exploratory Data Analysis Using Recommender System

Figure 2:
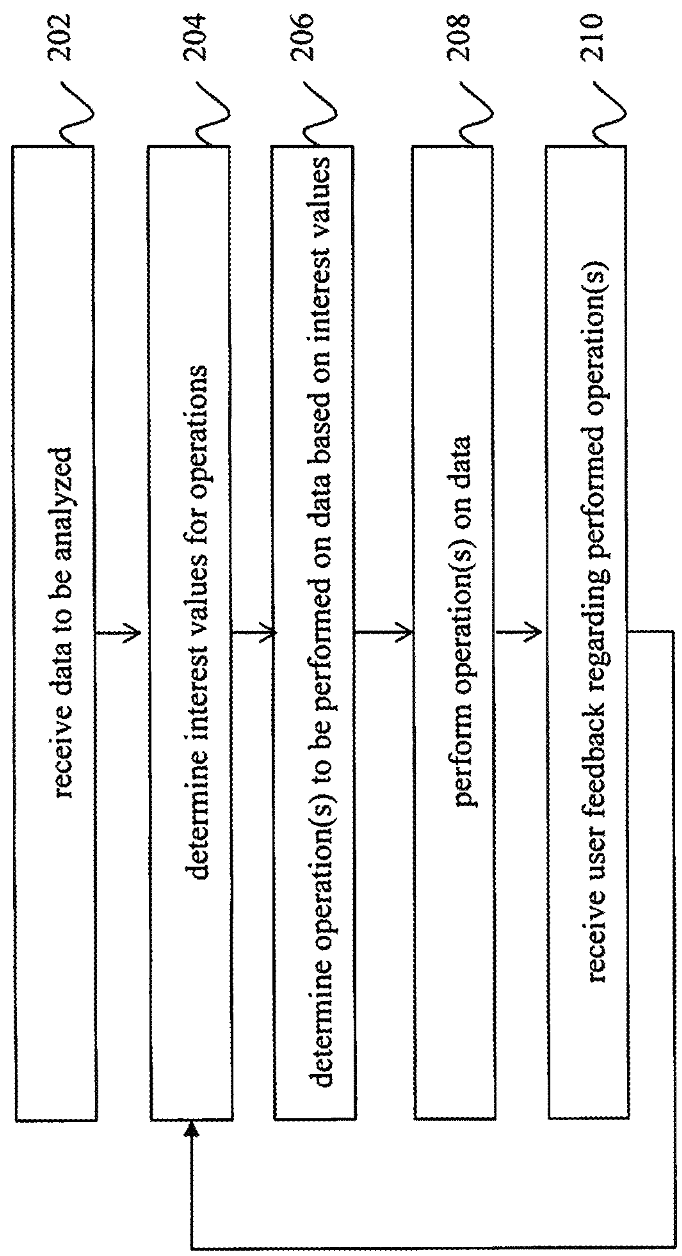
FIG. 2 is a flowchart of an exemplary method for exploratory data analysis using a recommender system in accordance with an embodiment of the present disclosure.

FIG. 2 is a flowchart of an exemplary method for exploratory data analysis using a recommender system in accordance with an embodiment of the present disclosure. In step 202, data to be analyzed is received. For example, in an embodiment, data gatherer 110 receives input data 104. In an embodiment, data gatherer 110 can also receive additional data generated by user feedback analyzer 116 based on user feedback data 108. Based on this received data, data gatherer 110 can generate gathered data 105.

In step 204, interest values for operations are determined. For example, in an embodiment, one or more policies stored in memory (e.g., memory 120) determines a set of rules for data analysis for one or more users. In an embodiment, data analyzer 112 can determine one or more appropriate polic(ies) (or appropriate rules) to apply to gathered data 105. This determination can be made, for example, based on an identity of the current user of recommender system 102 and/or based on a classification of input data 104. In an embodiment, the policy (or the rules) can determine interest values for the operations.

In step 206, operations to be performed on the data are determined based on the determined interest values. For example, in an embodiment, data analyzer 112 determines a set of operations to be performed based on the determined policy (or the rules) and gathered data 105. For example, in an embodiment, data analyzer 112 can select a predetermined number of operations to be performed on gathered data 105 based on the determined policy. In an embodiment, data analyzer can also use received user feedback data 108 to determine the set of operations to be performed. In step 208, the selected operations are performed on the data. In an embodiment, output is generated based on the performed operations by results generator 114, and output data 106 is sent to a user.

In step 208, user feedback regarding the performed operations is received. For example, in an embodiment, user feedback analyzer 116 receives and analyzes user feedback data 108. Analyzed user feedback data 108 can be sent to data gatherer 110, data analyzer 112, and/or results generator 114 for further analysis of input data 104 and to train recommender system 102 for future use. For example, in an embodiment, the method proceeds back to step 204, and user feedback data 108 is used to modify interest values for operations. The method can then proceed again to steps 206 and 208 to determine and perform new operations based on user feedback data 108. Additional user feedback data 108 can again be received in step 210 as the user continues providing feedback to recommender system 102 during the course of exploratory data analysis of input data 104. In an embodiment, if no user feedback is received, the method of FIG. 2 can stop at step 208. For example, after step 208, output data 106 can be sent to a user, and the method of FIG. 2 can wait to see if any user feedback data is received.

In an embodiment, recommender system 102 runs using parallel processing techniques (e.g., when using an agent-based embodiment, as discussed below with reference to FIG. 9). In an embodiment, multiple instances of the method described by FIG. 2 can be running simultaneously, and the results of the operations performed according to the method of FIG. 2 can be collated into a single list. For example, in an embodiment, at step 206, recommender system 102 can determine a plurality of operations to be performed and can use a different agent to perform each operation at step 208 and/or to receive user feedback at step 210. In an embodiment, the results of these parallel processes performed by these agents can be later combined after operations are performed (e.g., in step 208) and/or after user feedback is received (e.g., in step 210). For example, in an embodiment, the combined results of these parallel processes can be used to modify interest values in step 204 and/or to determine further operations to be performed on gathered data 105 in step 206.

3.6 Implementations

Recommender system 102—including data gatherer 110, data analyzer 112, results generator 114, and user feedback analyzer 116—can be implemented using hardware, software, or a combination of hardware and software. In an embodiment, recommender system 102 is implemented using computer code executing on one or more general purpose computers. In another embodiment, recommender system 102 is implemented using computer code executing on one or more special purpose computers and/or devices. In an embodiment, any combination of a plurality of general purpose computers, a plurality of special purpose computers, and/or a plurality of devices can operate together to perform the systems and/or methods described by embodiments of the present disclosure.

In an embodiment, data gatherer 110, data analyzer 112, results generator 114, and user feedback analyzer 116 are implemented using one or more blocks of code, such as software modules, executing on a processor that is a part of recommender system 102 (e.g., processor 118) or is accessible by recommender system 102. In another embodiment, recommender system 102 is implemented using hardware (e.g., using circuitry, hardware logic, and/or chips). For example, in an embodiment, recommender system 102—including data gatherer 110, data analyzer 112, results generator 114, and user feedback analyzer 116—is implemented on a single chip as part of a device (e.g., a general purpose computer or a special purpose device). It should further be understood that each of data gatherer 110, data analyzer 112, results generator 114, and user feedback analyzer 116 can be implemented using any number of chips in a device. For example, in an embodiment, each of data gatherer 110, data analyzer 112, results generator 114, and user feedback analyzer 116 can be implemented on a separate chip. Additionally, in an embodiment, the functionality of data gatherer 110, data analyzer 112, results generator 114, and user feedback analyzer 116 can be implemented by a single chip, device, module, and/or block of code in accordance with embodiments of the present disclosure. Exemplary implementations of recommender system 102 are discussed in further detail below.

In an embodiment, recommender system 102 includes security functionality that enables recommender system 102 to securely receive input data 104 and user feedback data 107 and/or to generate output data 106. For example, in an embodiment, recommender system 102 is implemented as part of a secure processing system on a host computer (e.g., host device 101). In an embodiment, recommender system 102 is configured to securely receive input data 104 and/or user feedback data 108 via a security technique such as encryption, password verification, a security certificate, etc. In an embodiment, recommender system 102 is configured to encrypt output data 106 before output data 106 is transmitted from recommender system 102.

4. Determining Operations to be Performed on Gathered Data

As discussed above, in an embodiment, data analyzer 112 can analyze gathered data 105, determine which operations to perform on gathered data 105, perform one or more of the determined operations on gathered data 105, and send the results to results generator 114. Data analyzer 112 can make an initial determination regarding how gathered data 105 should be processed based on stored information and can make further determinations regarding how gathered data 105 should be processed based on user feedback data 108. In an embodiment, to make these determinations, data analyzer 112 uses a set of rules to determine which operations data analyzer 112 should select for processing gathered data 105. These rules can take a variety of formats. For example, in an embodiment, these rules are part of the code of recommender system 102. In an embodiment, these rules can be stored in a policy in memory (e.g., stored in memory 120 or any other memory accessible by recommender system 102.)

When gathered data 105 is first received by data analyzer 112 (e.g., before user feedback data 108 has been received for the current data set), data analyzer 112 can access the rules to make an initial determination regarding how gathered data 105 should be processed. In an embodiment, data analyzer 112 can first classify input data 104 to determine a type of the data set before making the initial determination. This type determination can be based on the file type corresponding to input data 104, a user specification, information within input data 104 designating its type, etc. Data analyzer 112 can use the type determination and the rules to determine initial operations to be performed. In an embodiment, the rules may further specify one or more further operations to be performed based on one or more results from these initial operations. For example, in an embodiment, one or more rules can specify that an F-test (e.g., a statistical test in which the test statistic has an F-distribution under the null hypothesis finds a significant difference for an independent variable with more than two levels) should be performed for certain types of experimental data. If the F-test finds a significant difference for an independent variable with more than two levels, the rules can specify that a post-hoc t-test (e.g., a statistical hypothesis test in which the test statistic follows a Student's t-distribution if the null hypothesis is supported) should be applied to the data.

In an embodiment, recommender system 102 can further determine which operations should be performed based on user feedback data 108. In an embodiment, the rules can specify which operations data analyzer 112 should select based on received user feedback data 108. For example, once a set of experimental data is loaded into recommender system 102, recommender system 102 may initially determine that an F-test and a t-test should be performed. Results generator 114 can generate the results of these tests and present them to the user via a UI (e.g., via producing one or more charts, graphs, etc. corresponding to these tests). Results generator 114 can also present (e.g., via the UI) the user with additional operations that can be performed, ranked according to interest values. If the user selects one of these additional operations, this selection can be passed back to recommender system 102 as user feedback data 108. This user feedback data 108 can be analyzed by user feedback analyzer 116. Based on the rules, user feedback analyzer 116 (and/or data analyzer 112) can instruct data analyzer 112 to perform one or more operations corresponding to the user-selected operation identified in user feedback information 108. Results generator 114 can then present the results of this user-selected operation to the user as output data 106 via the UI (e.g., results generator 114 can generate new charts, graphs, etc. based on the user-selected operation).

In an embodiment, user feedback analyzer 116 can modify the rules based on user feedback data 108 (e.g., in an embodiment, user feedback analyzer 116 can raise the interest value of the user-selected operation so that it is ranked higher in the additional operations presented to the user via the UI when the same or similar user uses recommender system 102. In an embodiment, if the operation attains enough interest (e.g., an interest value above a predetermined threshold), the operation can become an initial operation that is performed on a data set that the same or similar user analyzes before recommender system 102 receives any user feedback data.

In an embodiment, recommender system 102 can access the rules to determine if a user is similar to a previous user. For example, the rules may specify that a user is similar to a previous user if the user works in a related field to a previous user, has worked on the same (or related) project as a previous user, works at the same (or related) location as a previous user, has a similar workflow as that of a previous user, has data of a similar structure to a previous user, etc. In an embodiment, recommender system 102 can store multiple sets of rules corresponding to multiple users and/or user types (e.g., users corresponding to a certain field). In an embodiment, a user can instruct recommender system 102 to load a specific rule set corresponding to a certain user or a certain type of users. Further, in an embodiment, recommender system 102 can enable a user to manually edit the rules corresponding to a user or a certain type of users. In an embodiment, recommender system 102 includes security functionality that prevents unauthorized users from making such edits without permission.

As discussed above, recommender system 102 is configured to perform multiple operations using input data 104, and a user can provide user feedback data 108 to enable recommender system 102 to select different operations to be performed during the course of data analysis. In an embodiment, recommender system 102 can predict new operations that a user might be interested in by assigning potential operations and/or variables higher interest values when related analytical operations are determined to be of statistical significance. For example, in an embodiment, recommender system 102 can determine that initially, summary statistics should be generated and recommended to analyze input data 104. As a user explores the generated summary statistics and provides user feedback data 108, recommender system 102 can use this feedback to recommend additional operations that have statistical significance and/or involve some of or all of the variables whose summary statistics were determined to be of interest.

For example, recommender system 102 can determine the effects of an independent variable that the user indicated an interest in on dependent variables (or other independent variables). If there is a statistically significant effect on one or more dependent variables, recommender system 102 can assign interest to these dependent variables and/or operations involving these dependent variables and recommend them to the user. Further, recommender system 102 can recommend performing operations using variables where a user indicates interest (e.g., correlations). In an embodiment, recommender system 102 can recommend using principle components analysis (PCA) techniques to plot variables in which a user indicates interest on a domain to determine dimensions where there is a difference among these variables. Further, in an embodiment, recommender system 102 can suggest converting a variable from an independent variable to a dependent variable (e.g., if doing so would result in a statistically significant result).

In an embodiment, the operations that recommender system 102 can perform include descriptive statistics (e.g., min, max, mean, var, frequency count, etc.) analysis of variance (ANOVA), principal components analysis (PCA), correlation, moving average, function approximation, sampling, outlier tests, Fourier analysis, time-series analysis, and other operations used for statistical analysis. For example, in an embodiment, recommender system 102 can include operations for statistical tests for descriptive statistics (e.g., describing the data and its distribution), parametric statistics (e.g., to test for relationships or differences using correlation or more sophisticated forms of regression), and non-parametric statistics. In an embodiment, group differences can be tested using ANOVA techniques both within subjects and between subjects' variables.

5. Exemplary Use Cases

As discussed above, recommender system 102 can be used with a variety of data to perform and recommend operations based on data sets. Two exemplary use cases for data analysis that can be performed using recommender system 102 in accordance with embodiments of the present disclosure are discussed below.

5.1 Use Case 1: Data Derived from Image Analysis of Stimuli for a User Study

In a first exemplary use case of recommender system 102, input data 104 includes metrics on images used in user studies of multivariate visualization techniques. In this example, input data 104 includes approximately 600 measures, on 108 stimuli studied for multivariate visualization. EDA is performed on input data 104 using recommender system 102 to determine whether objective measures of image properties offer insight into user performance (e.g., error and response time). In an example, the objective properties include target/distraction differences in color or intensity distribution, edge strength or orientation, texture frequency, etc.

Input data 104 is received by data gatherer 110 and analyzed by data analyzer 112 to determine and perform initial operations on input data set 104 based on a stored policy. In this example, data analyzer 112 infers the type of variables in input data 104 (e.g., string, integer, floating point) and the distribution type of the variables. Based on a stored policy, data analyzer 112 determines that the initial operations to be performed on input data 104 should be summary statistics, captured in a plurality of histograms. Output data 106 for histograms of the summary statistics is generated by results generator 114 and sent to the user.

Figure 3:
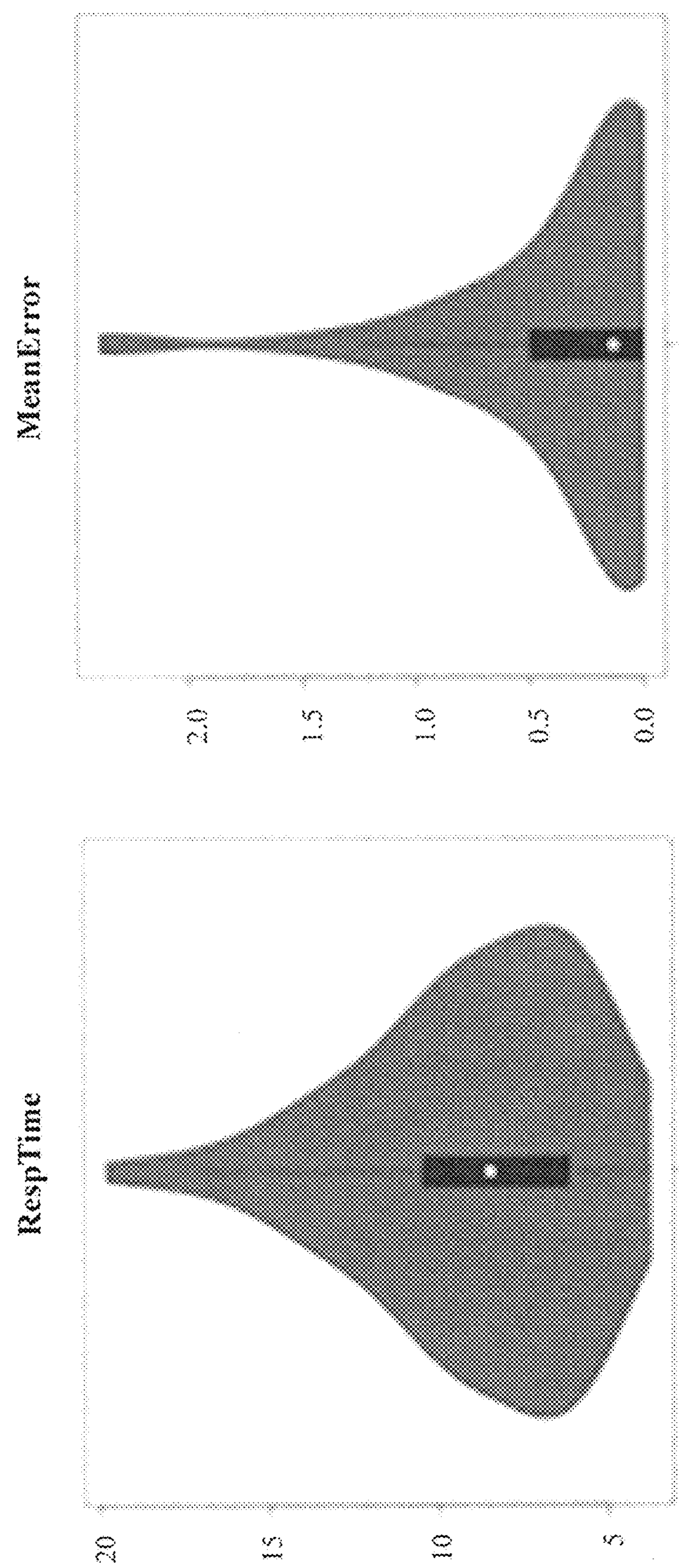
FIGS. 3-8 show exemplary output that can be displayed to a user based on output from a recommender system in accordance with embodiments of the present disclosure.

FIG. 3 shows exemplary output graphs generated based on output data 106 in accordance with this use case. In this example, the recommender system recommends that the user examine summaries of variables according to a stored policy, and the user has selected the variables "mean error" and "response time." The recommender system 102 generates and displays the violin plots (e.g., histograms with box plots embedded to show mean and other summary statistics) shown in FIG. 3 for these variables in response to these user selections. The user then indicates interest in the variables for "mean error" and "response time" (e.g., via a "like" button). For example, the user might consider these variables interesting because their distributions do not fit any "standard" distribution patterns like uniform, Gaussian, etc. Additionally, for example, these variables might be interesting because of expert domain knowledge regarding them (e.g., an expert might want to explain these variables and their corresponding values when conducting a user study). The UI detects these user indications and transmits user feedback data 108 to recommender system 102 indicating that the user indicated interest in these two variables. User feedback analyzer 116 analyzes these indications and sends information to data analyzer 112. Based on user interest in the "mean error" and "response time" variables, data analyzer 112 accesses the policy (which stores information regarding domain expert recommendations for further EDA on these variables) to determine additional operations to be performed based on this indicated user interest. Data analyzer 112 determines, based on the rules and/or policy, that the user may be interested in F-tests using these two variables and a third variable, "visualization technique," and sends information to results generator 114 to generate new output data 106. For example, data analyzer 112 can determine to recommend two separate F-tests, each of which involves one of the variables whose summaries were "interesting" (e.g., "mean error" and "response time") in addition to "visualization technique."

Figure 4:
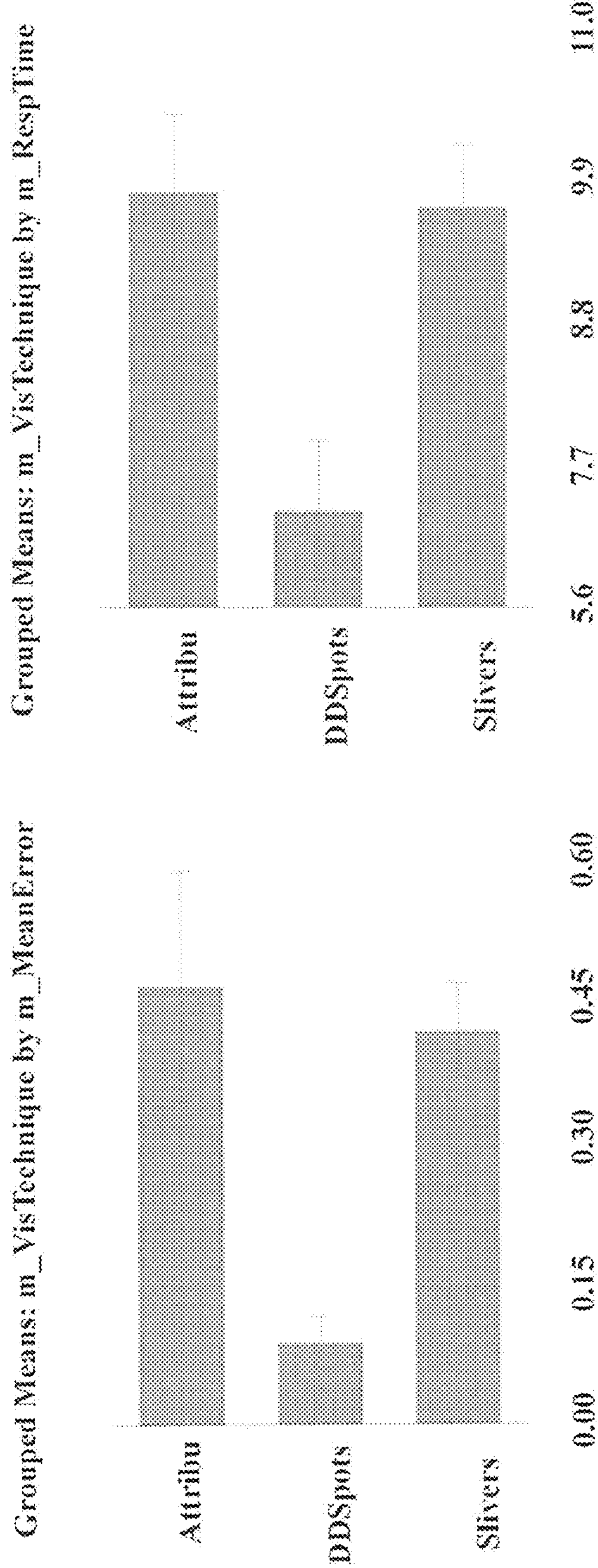

FIG. 4 shows exemplary output graphs generated based on output data 106 showing a result of an F-test for these variables. The two graphs shown are the standard way to show the result of an F-test (difference of means). Each group is shown as one bar in a bar graph, with error bars for one unit of standard error. The F-test shows that (some pair of) the means are statistically different. A domain expert might recommend that a post-hoc test such as a I-test or Tukey's Honestly Significant Difference test would be applied to verify this statistical difference. In accordance with the stored policy of recommender system 102, results that qualify as "statistically significant" (according to predetermined specifications in the policy) are assigned more interest value by recommender system 102 than results that do not qualify as "statistically significant." The user then indicates interest in the F-test, which is passed back to recommender system 102 as user feedback data 108.

Figure 5:
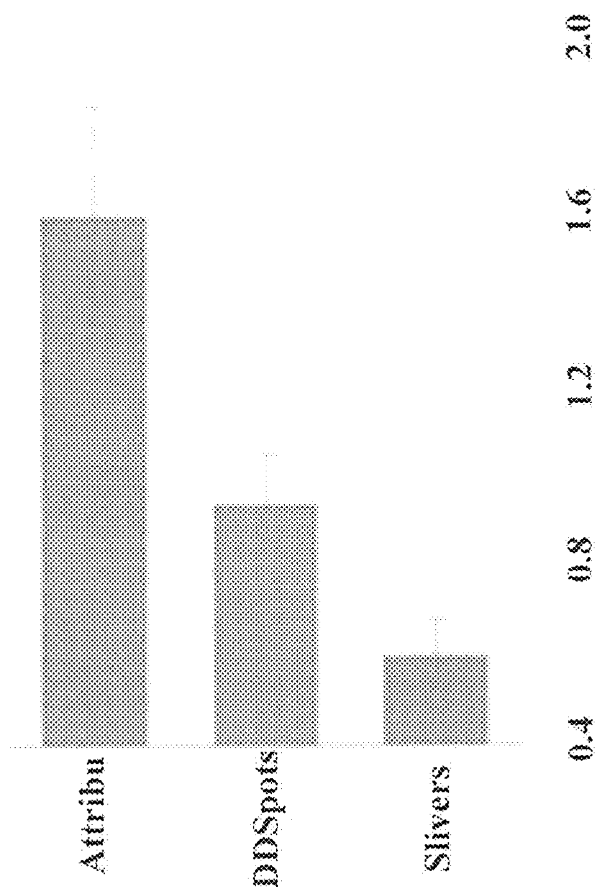

Recommender system 102 then recommends, based on this user feedback data 108 (as well as prior user feedback data), an F-test that has statistical significance: an F-test using the variables "visualization technique" on "relative edge strength." These were both independent variables that would not normally have been combined in this type of test. In this case, the data indicates that edges, which are a basic perceptual cue, have vastly different strengths in the techniques. FIG. 5 shows an exemplary graph generated based on output data 106 illustrating these differences. Using recommender system 102 for EDA for this input data 104, recommender system 102 has focused analysis onto a potentially insightful result in the three steps discussed above that was neither requested by the domain expert analyst nor "conventional" by standard practice. Yet it does tell the user something about why the data behaves as it does, which is the ultimate goal of all data analysis.

5.2 Use Case 2: Data Derived from Eye Tracking During a Supervisory Task

Figure 6:
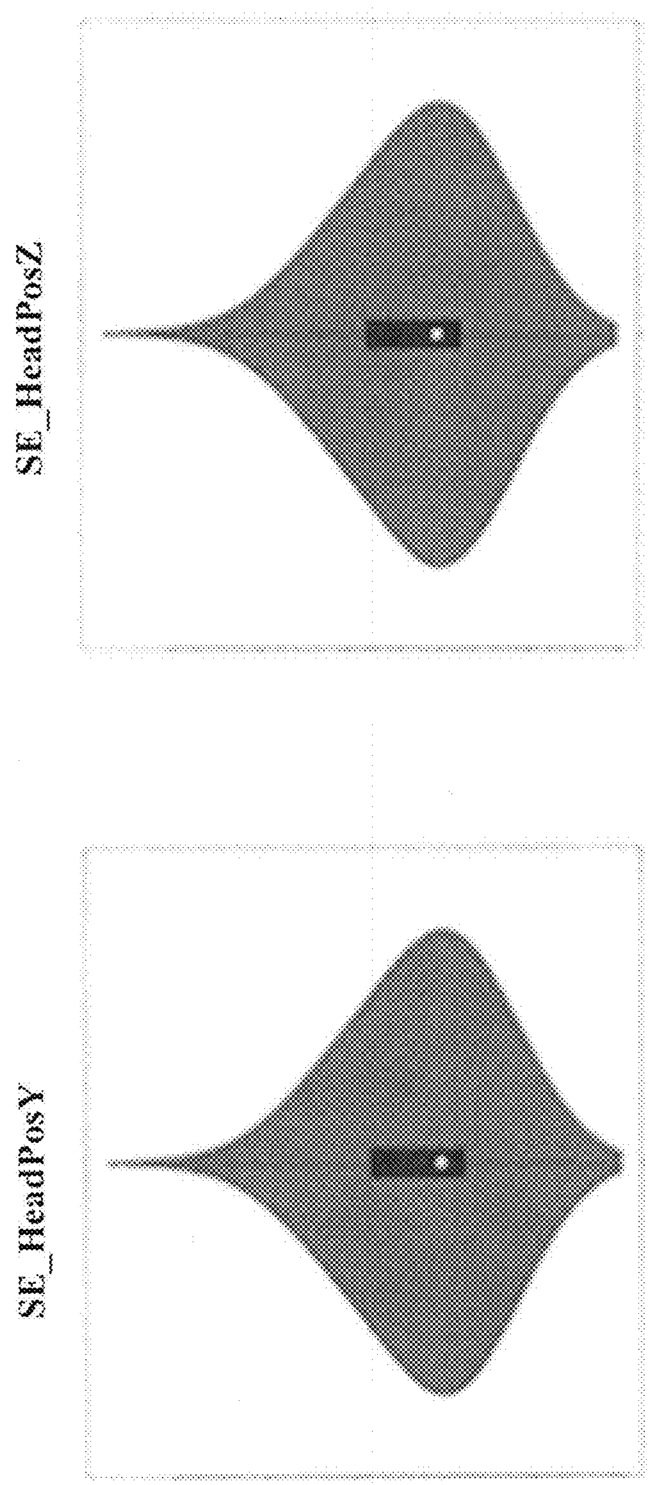

In a second use case, input data 104 includes data derived from tracking users' gaze during supervisory control tasks. In such applications, the user may be monitoring and intervening in multiple automated or human performance tasks. These tasks are often subject to high workload, and the hope is to determine biometric measures such as pupil diameter and eyelid opening to determine when the operator is experiencing stress or fatigue due to the workload level. Based on input data 104, recommender system 102 generates summary statistics based on an initial operation determined by recommender system 102 according to a stored policy. In this case, the data analyst notices similarity in the distributions of two variables (measuring a user's head position for the Y and Z dimensions) based on the generated summary statistics. FIG. 6 shows exemplary graphs generated based on output data 106 showing the similarity in these distributions. Based on this similarity, the analyst surmises that there might be an error in input data 104 and requests a correlation between those two variables to be conducted via user feedback data 108. The correlation is revealed as a perfect correlation, indicating that an error in input data 104 is likely. The analyst had familiarity with principal components analysis (PCA), so she requested that a PCA be conducted. This served to provide further confirmation of the similarity of certain variables, including the two head position variables. This ended one line of investigation.

The analyst then returned to the summary graphs, focusing on a known issue with eye tracking data—it is often noisy, and trackers may return invalid values. In particular, the analyst was concerned about the pupil diameter measurements. A normal maximum pupil diameter for a person working in a dark room is approximately one centimeter. The analyst declared interest in the summary of the pupil diameter variables (for left and right eye, independently measured). She then requested the correlation between the left and right eye data, and indicated interest in the result.

Figure 7:
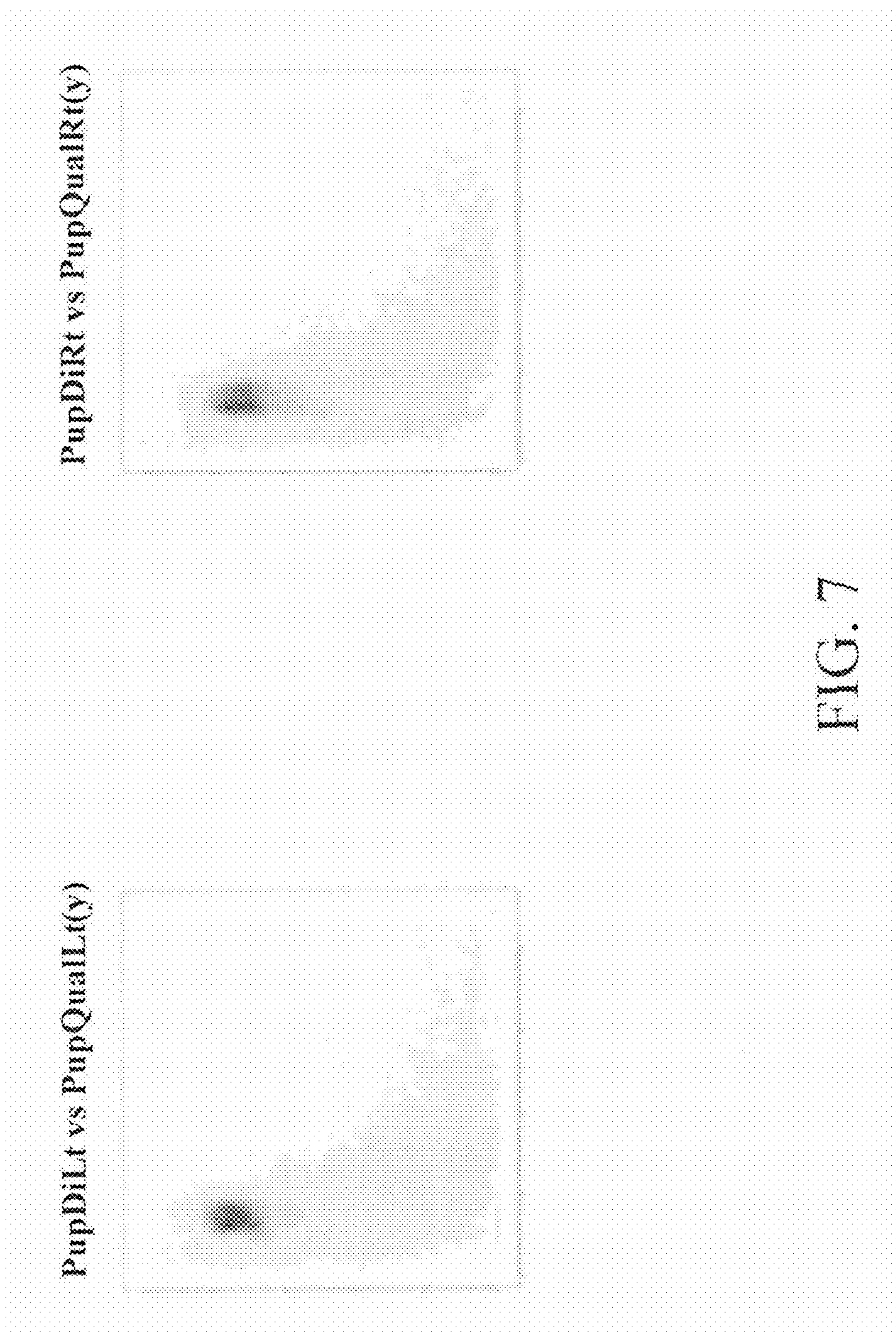

This (in addition to the correlation of the Y and Z head position variables, described above) triggered correlations of these variables with other variables, such as the quality metrics associated with each measurement. These correlations, shown in FIG. 7, indicate that the threshold for the quality metric (which was set to ">0") needs to be much higher to ensure that only valid measures of pupil size are considered. While this conceptual result was not surprising to the analyst, the exact values were unknown prior to this analysis.

Figure 8:
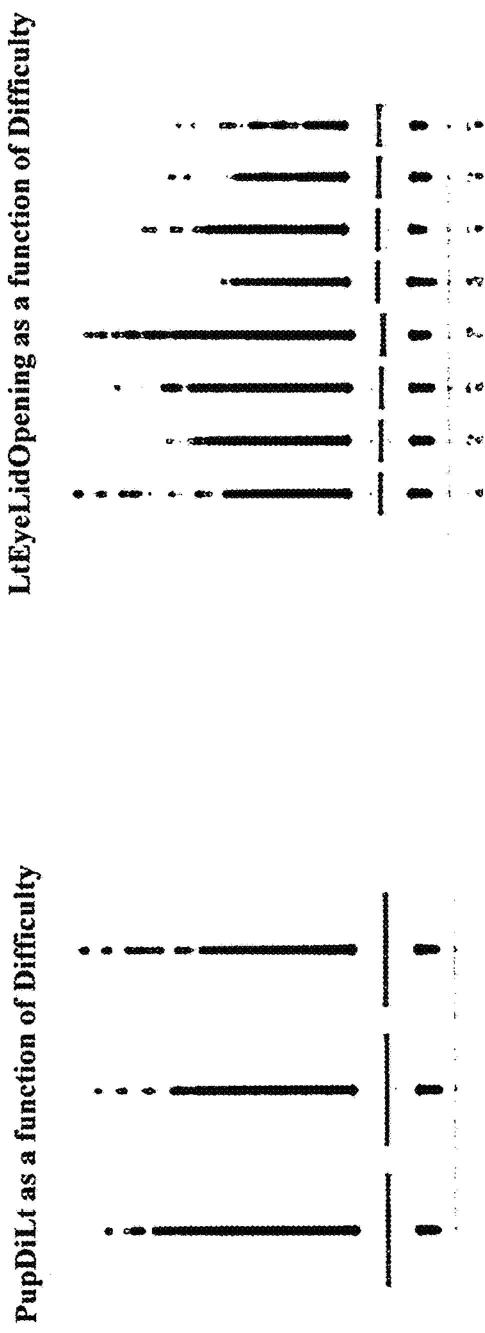

The analysis finished with a request for the known repeated-measures ANOVA results for the variable Difficulty (shown in FIG. 8). A recommendation for a previously unexplored ANOVA operation was recommended because it included a dependent measure (left pupil diameter, PupDiLt) that was involved in results in which the analyst showed interest, and because the repeated measures ANOVA results were labeled as interesting. This analysis helped identify a need for a more restrictive outlier removal threshold.

6. Exemplary Recommender System Embodiments

As discussed above, recommender system 102 can be implemented in a variety of environments, including embodiments using hardware, software, or a combination of hardware and software. In an embodiment, recommender system 102 is implemented as a software program stored in memory 120, and host device 101 is a general purpose computer that executes code for recommender system 102. Code for recommender system 102 can use agent-based or non-agent based methods to implement functionality of recommender system 102.

6.1 Exemplary Agent-Based Recommender System

In an embodiment, recommender system 102 uses a multi-agent feature-based recommender framework. Recommendations can be provided by mapping users through shared features to recommend items. Such features can be statistically analyzed data combinations with characteristics that indicate other data combinations (e.g., items). Similarity in user preferences or analyzed-data combinations favored by other users can be used to infer relevant items for user exploration or additional processing. The use of agents can provide scalability (e.g., by enabling the use of parallel processing techniques) and adaptive capabilities demanded by an EDA application.

In an embodiment, operations can be conducted using a system of automated agents which run hidden in the background of recommender system 102. Such an agent-based system can increase efficiency because a master agent can balance the computational load across the available resources. Any number of agents (e.g., from 1 to any number, limited only by the computational power and operating system of host device 101 and/or recommender system 102) may be employed, and the agents may run on any number of physical or virtual computational platforms.

Figure 9:
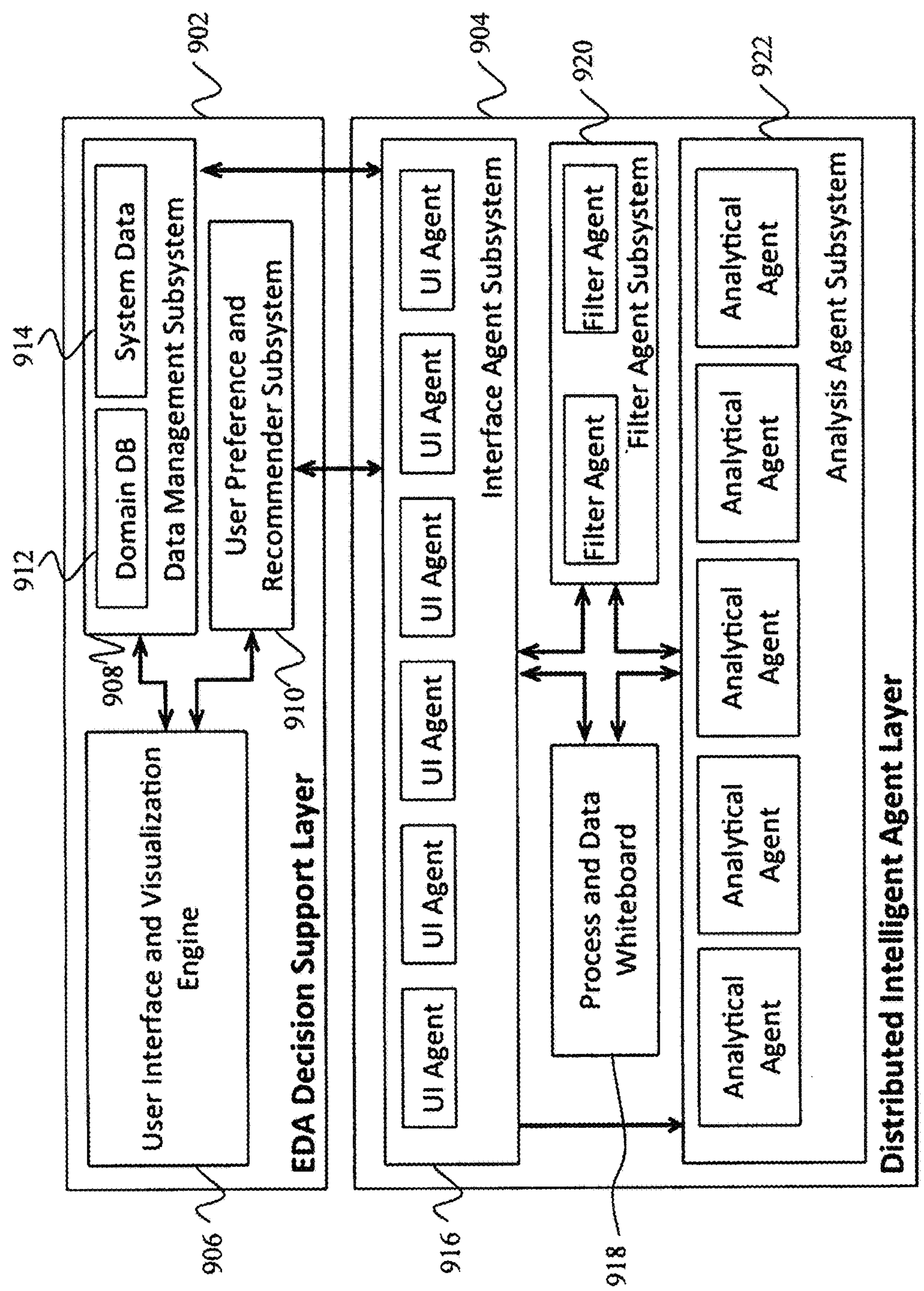
FIG. 9 shows a block diagram of an exemplary agent-based environment for a recommender system in accordance with an embodiment of the present disclosure.

FIG. 9 shows a block diagram of an exemplary agent-based environment for a recommender system in accordance with an embodiment of the present disclosure. The environment shown in FIG. 9 includes EDA decision support layer 902 and distributed intelligent agent layer 904. In an embodiment, EDA decision support layer 902 includes user interface and visualization engine 906, data management subsystem 908, and user preference and recommender subsystem 910. For example, in an embodiment, user interface and visualization engine 906 can be used to generate the UI provided to the user (e.g., generated using results generator 114 as part of output data 106).

Data management subsystem 908 can be used to store information used to determine operations to be performed using input data 104 and/or gathered data 105. For example, in an embodiment, domain database (DB) 912 of data management subsystem 908 can store data received via input data 104 and/or user feedback data 108, and system data 914 can include data from previous usages of recommender system 102 and/or information regarding potential recommendations that should be made based on expert knowledge and known best practices. In an embodiment, user preference and recommender subsystem 910 can communicate with user interface and visualization engine 906 and data management subsystem 908 to make recommendations to the user regarding potential operations to be performed using input data 104 and/or gathered data 105. For example, in an embodiment user preference and recommender subsystem 910 can implement functionality of data analyzer 112 and/or user feedback analyzer 116 by using multiple agents, implemented using distributed intelligent agent layer 904.

In an embodiment, distributed intelligent agent layer 904 includes interface agent subsystem 916, process and data whiteboard 918, filter agent subsystem 920, and analysis agent subsystem 922. In an embodiment, each of interface agent subsystem 916, filter agent subsystem 920, and analysis agent subsystem 922 can be used to distribute operations performed by data analyzer 112 among a plurality of agents, and process and data whiteboard 918 can be used to store temporary data (e.g., in memory 120 or another memory accessible by recommender system 102) used when performing these operations. For example, in an embodiment, interface agent subsystem 916 includes one or more UI agents used to generate and update the UI for the user. In an embodiment, filter agent subsystem 920 includes one or more filter agents used to determine, filter, and/or rank operations to be performed on input data 104 and/or gathered data 105 (e.g., based on a stored policy, rules, and/or interest values for corresponding to respective operations). In an embodiment, analysis agent subsystem 922 includes one or more analytical agents used to perform the operations determined by filter agent subsystem 920.

In an embodiment, UI agents of interface agent subsystem 916 can use a web framework (e.g., Django) using scripts (e.g., Python scripts) to ingest data in comma-separate value (CSV) files. In an embodiment, data management subsystem 908 can stores data in a database (e.g., a MongoDB3 database) and passes interest values to the agents of distributed intelligent agent layer 904. The number and distribution of agents can be hidden from the user. The analytical agents of analysis agent subsystem 922 can use statistical computing software to perform statistical computations (e.g., using software such as that provided by the R Project).

In an embodiment, when EDA decision support layer 902 collects data from the analytical agents of analysis agent subsystem 922, it can pass output data 106 back to the user interface as plain text tables, which can be parsed and loaded into the database management subsystem 908. In an embodiment, database management subsystem 908 implements a table of all variables and potential operations, as well as results (operations) and user ratings for interest. Interest can be distributed from user feedback on analytical results to variables and operations and accumulated from statistical significance. In an embodiment, analytical agents of analysis agent subsystem 922 perform analytical processes either based on rules (e.g., summary statistics can be computed upon loading data) or as guided/inferred by the user's interaction with the UI inclusive of items marked as interesting. Recommendations can be formed based on statistical results from processing filtered against the rule-based system, as well as a user's current exploration or explicit rating. In an embodiment, once data is stored in the database provided by data management subsystem 908, users can interact with the system by accessing a locally-run web server using a standard web browser.

6.2 Special Purpose Device Embodiments

In an embodiment, recommender system 102 can be implemented using a special purpose device (e.g., instead of using a general purpose computer). For example, in an embodiment, recommender system 102 and/or host device 101 can be implemented using stand-alone hardware designed to receive input data 104 and user feedback data 108 and to generate output data 106 to a user (e.g., via a screen or other output device coupled to the hardware used to implement recommender system 102 and/or host device 101 or in communication with the hardware used to implement recommender system 102 and/or host device 101).

For example, in an embodiment, recommender system 102 can be implemented on a chip of a special purpose recommender device that includes one or more input ports for receiving input data 104 and user feedback data 108 and one or more output ports for generating output data 106. In an embodiment, the hardware used to implement recommender system 102 and/or host device 101 can include a built-in display used to display output data 106 and/or a built-in input device used to receive input data 104 and user feedback data 108.

As discussed above, in an embodiment, input data 104 and/or user feedback data 108 can be actively or passively gathered. For example, in an embodiment, input data 104 is received via one or more sensors that can receive and/or monitor data in the environment and generate input data 104 without further input from a user. In an embodiment, such a sensor can be implemented in the hardware of recommender system 102 and/or host device 101. Alternatively, such a sensor can be implemented separately from the hardware of recommender system 102 and/or host device 101 but still in communication with recommender system 102. In an embodiment, a hardware sensor can be used to send information to a general purpose computer running code for recommender system 102. A variety of sensors can be used in accordance with embodiments of the present disclosure, including biometric sensors, infrared sensors, motion detection sensors, acoustic sensors, electrical sensors, cameras, microphones, etc.

In an embodiment, sensor 1002 (and/or data gatherer 110) is configured to detect a signal from a sensor used to receive input data 104 and to transform the signal into a different format. For example, in an embodiment, sensor 1002 can receive a wireless signal propagated through a medium, such as air or water, and transform the signal into an electrical format. In an embodiment, data gatherer 110 can decode the received signal to determine information transmitted in the signal and can send this information to data analyzer 112.

Figure 10:
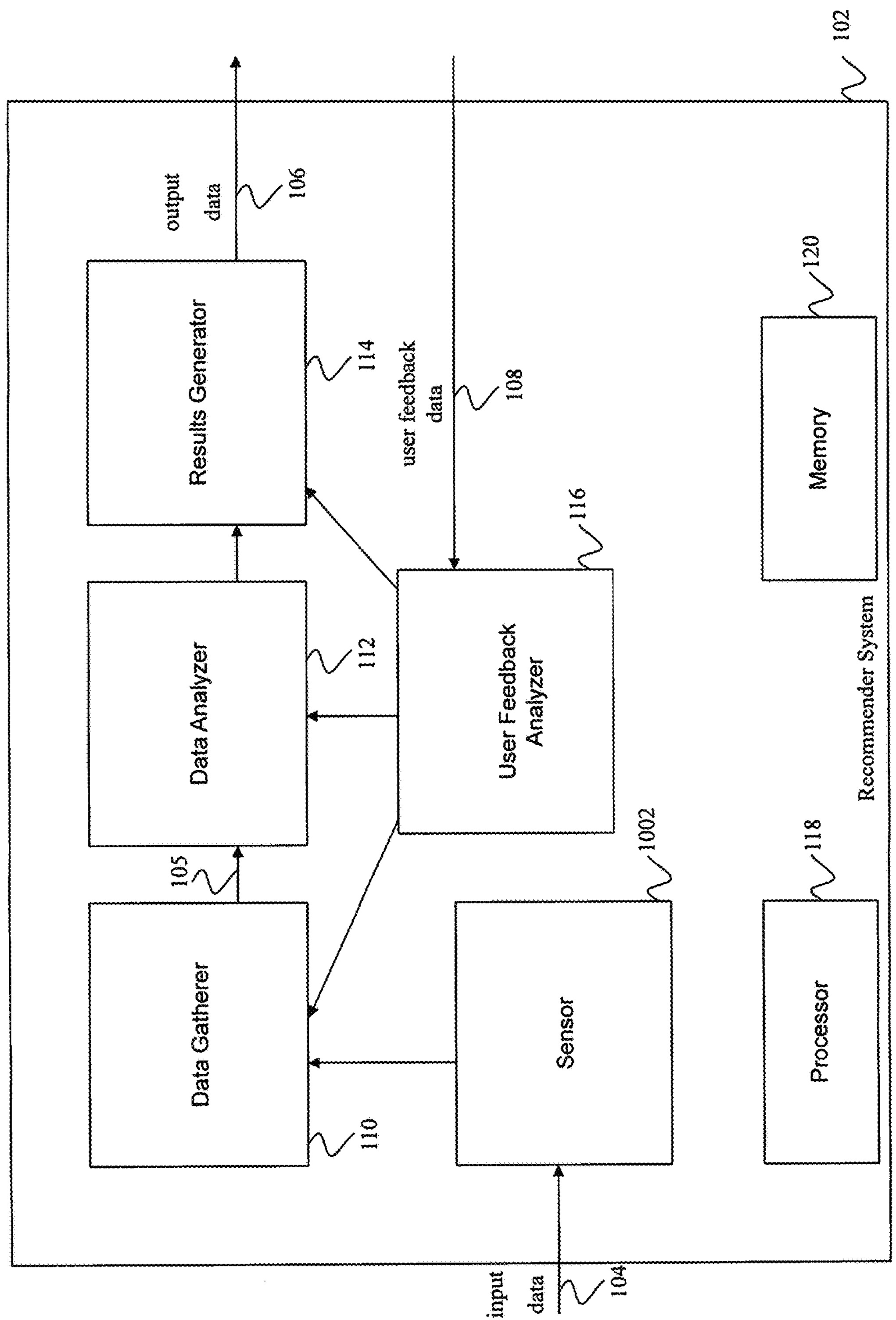
FIG. 10 shows a block diagram of an exemplary recommender system including a sensor in accordance with an embodiment of the present disclosure.

FIG. 10 shows a block diagram of an exemplary recommender system including a sensor in accordance with an embodiment of the present disclosure. In FIG. 10, sensor 1002 receives input data from the environment and sends the data to data gatherer 110 for further processing. In FIG. 10, user feedback data 108 is manually input from a user and is received by user feedback analyzer 116. However, it should be understood that, in an embodiment, user feedback data 108 can also be received using sensor 1002.

In an embodiment, sensor 1002 can detect a wireless signal propagated through a medium, such as air or water. For example, this signal can be a collection of sounds detected in a particular area that sensor 1002 can sense. Sensor 1002 sends information corresponding to these detected signals to data gatherer 110, which stores this information in a database (e.g., in memory 120) as signals are received. Data gather generates gathered data 105 based on sensed information and/or user feedback information 108 sent via user feedback analyzer 116. Data analyzer 112 can determine operations to be performed on gathered data and send information to results generator 114, which sends output data 106 to the user. The user can provide user feedback data 108 to user feedback analyzer 116. Data analyzer 112 can continually determine new operations to perform on gathered data 105 as more input data 104 is sensed by sensor 1002 and/or more user feedback data 108 is received.

7. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. An apparatus, comprising:

a data gatherer configured to receive input data;

a user feedback analyzer configured to receive user feedback data corresponding to first output data;

a data analyzer in communication with the data gatherer and the user feedback analyzer, wherein the data analyzer is configured to:

determine a type of the input data by classifying the input data, determine, without user input, interest values for a plurality of operations based on the determined type, determine, based on the determined interest values and stored rules for selecting operations from the plurality of operations, an initial operation from the plurality of operations to be performed based on the input data, and determine an analytical operation from the plurality of operations to be performed based on the user feedback data and the input data; and a results generator in communication with the data analyzer, wherein the results generator is configured to:

generate the first output data corresponding to the initial operation, and generate second output data corresponding to the analytical operation.

2. The apparatus of claim 1, wherein the initial operation comprises performing a summary statistics analysis using the input data.

3. The apparatus of claim 1, wherein the data analyzer is further configured to:

analyze, based on the user feedback data, a plurality of operations; and select the analytical operation from the plurality of operations based on determining that the analytical operation has statistical significance.

4. The apparatus of claim 3, wherein the data analyzer is configured to determine that the analytical operation has statistical significance based on determining that the analytical operation produces a statistically significant result.

5. The apparatus of claim 3, wherein the data analyzer is configured to determine that the analytical operation has statistical significance based on determining that user information associated with the input data corresponds to stored user information.

6. The apparatus of claim 1, wherein the data analyzer is further configured to:

analyze, based on the user feedback data, a plurality of variables; and select the analytical operation from the plurality of operations based on determining that the analytical operation uses a variable, in the plurality of variables, that is identified in the user feedback data.

7. The apparatus of claim 1, further comprising a sensor configured to:

receive the input data; and send the input data to the data gatherer.

8. The apparatus of claim 7, wherein the sensor is further configured to:

monitor an environment for the input data on a continual basis; and periodically send the input data to the data gatherer.

9. A method, comprising:

receiving, using processor circuitry, input data;

determining, using the processor circuitry, a type of the input data by classifying the input data;

determining, using the processor circuitry and without user input, interest values for a plurality of operations based on the determined type;

determining, using the processor circuitry and based on the determined interest values and stored rules for selecting operations from the plurality of operations, an initial operation from the plurality of operations to be performed based on the input data;

generating, using the processor circuitry, first output data corresponding to the initial operation;

receiving, using the processor circuitry, user feedback data corresponding to the first output data;

determining, using the processor circuitry, a statistically significant operation from the plurality of operations based on the user feedback data; and generating, using the processor circuitry, second output data corresponding to the statistically significant operation.

10. The method of claim 9, wherein the user feedback data comprises user interest information in a variable or an operation.

11. The method of claim 10, further comprising:

determining the statistically significant operation based on the user interest information.

12. The method of claim 9, wherein determining the statistically significant operation comprises determining that the statistically significant operation produces a statistically significant result.

13. The method of claim 9, wherein determining the statistically significant operation comprises determining that user information associated with the input data corresponds to stored user information.

14. A method, comprising:

receiving, using processor circuitry, input data to be analyzed;

determining, using the processor circuitry, a type of the input data by classifying the input data;

determining, using the processor circuitry and without user input, a plurality of interest values for a plurality of available operations for the input data based on the determined type;

determining, using the processor circuitry and based on the determined interest values and stored rules for selecting operations from the plurality of available operations, an initial operation to be performed using the input data;

performing, using the processor circuitry, the initial operation using the input data;

receiving, using the processor circuitry, user feedback data corresponding to the initial operation; and determining, using the processor circuitry, a second operation to be performed based on the user feedback data.

15. The method of claim 14, further comprising:

modifying the interest values based on the user feedback data.

16. The method of claim 14, further comprising:

receiving user information; and determining whether the user information corresponds to stored user information.

17. The method of claim 16, further comprising:

modifying the interest values based on determining that the user information corresponds to stored user information.

18. The method of claim 16, further comprising:

accessing a stored policy in response to determining that the user information corresponds to stored user information; and determining the plurality of interest values based on information in the policy.

19. The method of claim 14, further comprising:

determining that the second operation generates a statistically significant result.

20. The method of claim 9, wherein the data analyzer is further configured to select the stored rules based on an identity of a current user of the apparatus.

* * * * *